United States Patent [19]

Waugh

[11] 4,163,396
[45] Aug. 7, 1979

[54] DIGITAL READOUT PRESSURE SENSOR
[75] Inventor: John B. S. Waugh, Mountain Lakes, N.J.
[73] Assignee: The Singer Company, New York, N.Y.
[21] Appl. No.: 826,593
[22] Filed: Aug. 22, 1977
[51] Int. Cl.² .................................................. G01L 9/06
[52] U.S. Cl. .......................................... 73/721; 73/727
[58] Field of Search .............. 73/721, 727, 733, 754; 357/26

[56] References Cited
U.S. PATENT DOCUMENTS 3,247,718  4/1966  D'Onofrio .......................... 357/26
3,478,604  11/1969  Evans ................................ 357/26

Primary Examiner—Donald O. Woodiel
Attorney, Agent, or Firm—Charles R. Lewis

[57] ABSTRACT

A digital piezoresistive pressure transducer is provided wherein a pressure differential causes the resistance of two equal, diffused piezoresistances to change by equal but opposite amounts. The variable resistance of the two piezoresistance elements is utilized to correspondingly vary the time duration of two distinct voltage levels. The ratio of the time duration of the two voltage levels bears a linear relationship to the differential pressure across the transducer that enables the various values of pressure to be determined.

13 Claims, 2 Drawing Figures

U.S. Patent   Aug. 7, 1979   4,163,396
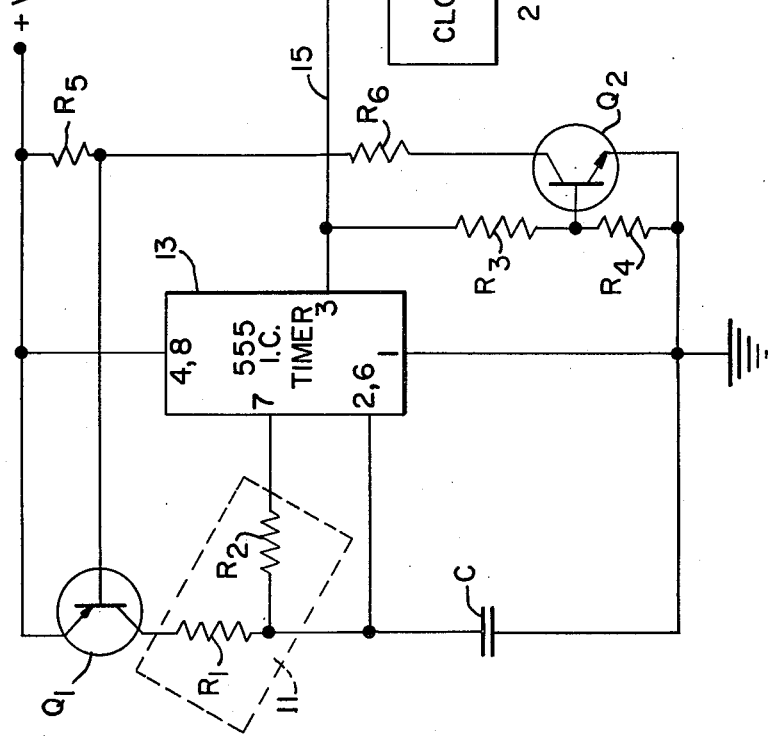
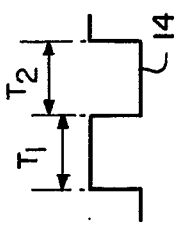

DIGITAL READOUT PRESSURE SENSOR

BACKGROUND OF THE INVENTION

Integrated circuit pressure transducers have been developed by utilizing equal resistive value piezoresistive elements on a single crystal silicon diaphragm. The operation of these devices is such that a change in pressure develops a strain in the silicon diaphragm which is effectively magnified by the diaphragm to vary the resistance of the piezoresistive elements. The piezoresistive elements typically include p type material which is diffused into an n type silicon diaphragm by standard phtoresist and diffusion techniques. By diffusing the piezoresistive elements orthogonally into the silicon diaphragm, a differential pressure across the silicon diaphragm causes the resistance of one piezoresistive element to increase and the resistance of the other piezoresistive element to decrease by an equal amount, in other words, a piezoresistive element subject to transverse strain changes its resistances by an amount equal in magnitude but opposite in sign to the change in resistance resulting from the application of the same strain in the longitudinal direction. These semiconductor pressure transducers are useful for observing and measuring very small pressure changes. The resistance of the piezoresistive elements changes with a change in pressure as a result of a change in the bulk resistivity of the piezoresistive material rather than as a result of a change of geometry, as in the case with wire or foil strain gages. This change of bulk resistivity is due to the effect of strain upon the asymmetric conduction band energy relative to valence band energy.

The output from the semiconductor pressure transducer is preferably digital rather than analog. A digital output is not noise or distance limited when transmitting the transducer output signals to a distant location. Additionally, analog to digital conversion errors are eliminated and digital integrated circuit techniques can be used to fabricate the entire transducer. In addition to reduced cost and increased reliability the digital output enables the transducer to be more readily temperature compensated.

Accordingly, one object of this invention is to provide a semiconductor digital pressure transducer system.

Another object of this invention is to provide an improved digital piezoresistive pressure transducer.

Still another object of this invention is to provide a digital piezoresistive pressure transducer that is economical to fabricate and reliable in operation.

BRIEF DESCRIPTION OF THE DRAWINGS

FIG. 1 is a combined schematic and block diagram illustration of a preferred embodiment of the present invention; and FIG. 2 illustrates an idealized waveshape within the system illustrated in FIG. 1.

DETAILED DESCRIPTION OF THE ILLUSTRATED EMBODIMENT

Referring now to FIG. 1, a semiconductor piezoresistive pressure transducer such as that discussed hereinabove is schematically illustrated within the dotted outline 11. The transducer or sensor 11 includes two piezoresistive elements $R_1$ and $R_2$ diffused into a silicon substrate (not shown). The piezoresistive elements $R_1$ and $R_2$ are so oriented on the sensor 11 that a pressure differential across the sensor 11 causes the resistance of element $R_1$ to increase and the resistance of the element $R_2$ to decrease by an equal amount.

An integrated circuit timer 13 is operated as an astable or free running oscillator. The frequency and the duty cycle of the timer 13 are both controlled by the two piezoresistive elements $R_1$ and $R_2$ of the pressure sensor 11 and a capacitor C. In accordance with one embodiment of the present invention, the timer 13 constituted a model NE/SE 555 timer manufactured by the Signetics Corporation of 811 East Arques Avenue in Sunnyvale, California 94086. The numerals within the rectangle 13 denoting the timer 13 indicate the various pin numbers to which the circuitry external of the timer 13 are connected. The operation of the timer 13 is such that the capacitor C is repeatedly charged and discharged between two thirds and one third of the value of the supply potential $+V$ under control of the timer 13. When the capacitor C is discharging to one third of the value of the supply voltage $+V$, the voltage level appearing on an output lead 15 is low. Correspondingly, during the time that the capacitor C is charging up to two thirds of the supply voltage $+V$, the voltage level on the lead 15 is high. The output of the timer 13 is illustrated in FIG. 2 by the waveform 14 wherein the high level occuring during the time duration $T_1$ corresponds to the time that the capacitor C is being charged and the time duration $T_2$ during which the waveform 14 is low corresponds to the time that the capacitor C is being discharged. The charge time of the capacitor C is determined by the value of the capacitor C and the value of the piezoresistance element $R_1$. Accordingly, when a change of pressure at the pressure sensor 11 causes the piezoresistance element $R_1$ to increase, the time duration $T_1$ will also increase. The discharge time of the capacitor C is determined by the value of capacitor C and the value of the piezoresistance element $R_2$. Accordingly, when a change of pressure at the sensor 11 decreases the value of the piezoresistance element $R_2$, the time duration $T_2$ of the low portion of the waveshape will decrease.

As shown in FIG. 1 the junction of the two piezoresistive elements $R_1$ and $R_2$ are connected to pins 2 and 6 of the time 13, which correspond to the trigger and threshold inputs, respectively, and also to one side of the capacitor C the other side of which is grounded. The end of the piezoresistive element $R_2$ remote from the junction is connected to pin 7 or discharge input of the timer 13. The end of the piezoresistive element $R_1$ remote from the junction is connected to the collector of a PNP transistor $Q_1$ which has its emitter coupled to the supply voltage $+V$. Also, connected to the supply voltage $+V$ are pins 4 and 8 of the timer 13. These pins are the reset and supply potential inputs for the timer 13. Connected in series between the supply potential $+V$ and ground potential are resistor $R_5$ and $R_6$ and an NPN transistor $Q_2$. The transistor $Q_2$ has its collector connected to one end of the resistor $R_6$ and its emitter grounded. Also connected to ground is pin 1, the ground input to the time 13. The base of the transistor $Q_1$ is connected to the junction of resistors $R_5$ and $R_6$. The output of the timer 13 appears on lead 15 from pin 3. Connected between the output lead 15 and ground potential are two series resistors $R_3$ and $R_4$. The base of the transistor $Q_2$ is connected to the junction of resistors $R_3$ and $R_4$.

Assume now that the output of the timer 13 on lead 15 goes low corresponding to the time duration $T_2$. The low potential appears at the base of the transistor $Q_2$ and renders it nonconductive. Resistor $R_4$ insures that the collector to base leakage current of transistor $Q_2$ does not allow the transistor $Q_2$ to turn on. Similarly, resistor $R_5$ is selected to insure that the collector leakage current of $Q_2$ will not turn transistor $Q_1$ on. While $Q_1$ is off the capacitor C discharges through the piezoresistive element $R_2$ until the potential level appearing on pins 2 and 6 of the timer 13 reaches one third of the supply level +V. When this occurs the timer 13 causes the output level appearing on lead 15 to become high. Transistor $Q_2$ is now driven into saturation thereby turning on transistor $Q_1$ by way of resistor $R_6$ which limits the collector current of transistor $Q_2$. The capacitor C is now charged through the piezoresistive element $R_1$ under control of the timer 13 until the potential level on the pins 2 and 6 reaches two thirds of the supply potential +V at which time the capacitor C will again discharge to one third of the supply potential +V. The timer 13 will continue to repetively charge and discharge the capacitor 13. As will be apparent from the above, the time duration $T_1$ during which the output waveform 14 on the lead 15 is high given by $T_1 = 0.693 R_1 C$. Correspondingly, the time duration $T_2$ during which the output waveform 14 is low is given by $T_2 = 0.693 R_2 C$.

The ratio r of the difference of the time durations to the sum of the time durations of the high and low output levels of the timer circuit 13 is defined by $$r = \frac{R_1 - R_2}{R_1 + R_2} = \frac{T_1 - T_2}{T_1 + T_2} \quad \text{(A)}$$

and is independent of both the value of the capacitor C and the clock 21 frequency. The clock 21 is discussed hereinbelow in detail.

If $RO_1$ and $RO_2$ are defined as the nominally equal resistors $R_1$ and $R_2$ in the piezoresistive pressure sensor 11 in the absence of a pressure differential and $RO_1$ increases with pressure and $RO_2$ decreases with pressure, we can write $$R_1 = RO_1 (1 + \alpha P)$$

$$R_2 = RO_2 (1 + \alpha P)$$

where
P = pressure and
$\alpha$ = the fractional change in sensor 11 resistance per unit resistance per unit change in pressure.

Substituting these definitions in equation A yields $$r = \frac{RO_1(1 + \alpha P) - RO_2(1 - \alpha P)}{RO_1(1 + \alpha P) + RO_2(1 - \alpha P)} \quad \text{(B)}$$

which simplifies to $$r = \frac{RO_1 - RO_2 + \alpha P(RO_1 + RO_2)}{RO_1 + RO_2 + \alpha P(RO_1 + RO_2)} \quad \text{(C)}$$

$$r = \frac{\frac{RO_1 - RO_2}{RO_1 + RO_2} + \alpha P}{1 + \frac{\alpha P(RO_1 - RO_2)}{RO_1 + RO_2}} \quad \text{(D)}$$

Since $\alpha P$ is much less than unity and $\Delta R = (RO_1 - RO_2)$ which is much less than $\Sigma R = (RO_1 + RO_2)$, equation D can be simplified to $$r \approx \Delta R / \Sigma R + \alpha P \quad \text{(E)}$$

The term $\Delta R / \Sigma R$ represents a pressure independent initial offset due to the inequality of the nominally equal diffused piezoresistance elements $R_1$ and $R_2$ and is a constant for a given temperature. The term $\alpha P$ is the pressure P induced component of change in the piezoresistive elements. Equation E shows that the ratio r is a linear function, i.e., a straight line function, of pressure P. Accordingly, by measuring the ratio r for two known values of pressure P, $\alpha$ and $\Delta R / \Sigma R$ can be obtained to calibrate the sensor 11 so that the pressure P can be readily determined for any value of the ratio r.

The time intervals $T_1$ and $T_2$ are measured by a circuit that includes a source of clock pulses 21, a first NAND gate 17, a second NAND gate 19 having an inverter 23 associated therewith, a first counter 25 and an associated latch circuit 27 and a second counter 29 and an associated latch circuit, 31. Proper resolution of the $T_1$ and $T_2$ time intervals can be obtained by using a clock 21 that has a pulse repetition rate of about one megacycle per second. The output of the clock 21 is coupled to one input of the NAND gate 17 and to one input of the NAND gate 19. The output of the timer 13 appearing on lead 15 is applied to the other input of the NAND gate 17, to the other input of the NAND gate 19 by way of the inverter 23 and as an input to a microprocessor 35 or other suitable processing circuitry. The output of the NAND gate 17 is coupled to the counter 25. A count stored within the counter 25 can be transferred to the latch circuit 27 under control of the microprocessor 35. The output of the NAND gate 19 is coupled to the counter 29. A count in the counter 29 can be transferred to the latch circuit 31 under control of the microprocessor 35. The microprocessor 35 in addition to controlling the transfer of the count in the counters 25 and 29 to the latches 27 and 31, respectively, can also function to reset the counters 25 and 29.

The operation of the system illustrated in FIG. 1 is such that during the time duration $T_1$ when the output of the timer 13 is high, NAND gate 17 is enabled and NAND gate 19 is disabled. This enables the clock 21 pulses to be counted by the counter 25. Accordingly, at the beginning of the time duration $T_2$ when the output of the timer 13 goes low the count in the counter 25 is a measure of the time duration $T_1$. When the output of the timer 13 goes low, NAND gate 17 is disabled and NAND gate 19 is enabled because of the inverter 23 output. This causes the clock pulses to be counted by the counter 29 such that by the end of the time period $T_2$ the count in the counter 29 is a measure of the time duration $T_2$. During the time $T_2$ that the counter 29 is being stepped, the count in the counter 25 corresponding to the time duration $T_1$ can be transferred to the latch 27 and therefrom to the microprocessor 35. Correspondingly, when the time period $T_1$ is being determined by pulses being applied to the counter 25, the count in counter 29 corresponding to the time duration $T_2$ can be transferred to the latch 31 and therefrom to the microprocessor 35. As will be apparent from the above, transfer of the contents of the counters 25 and 29 to the corresponding latch circuits 27 and 31 will enable the counters 25 and 29 to thereafter be reset to zero to be in a condition to begin counting to measure the next occurring time interval $T_1$ or $T_2$ associated therewith.

As will be apparent to those skilled in the art, the microprocessor 35 or other suitable data processing circuitry can be readily programmed or designed to utilize the successively occurring counts in counters 25 and 29 corresponding to the time durations $T_1$ and $T_2$, respectively, to continuously calculate the ratio r described hereinabove. From these calculated ratio r values, the corresponding pressure P can be continuously calculated once the sensor 11 has been calibrated as discussed above. Additionally, since the piezoresistive pressure sensor 11 is temperature dependent, the microprocessor 35 can be programmed to correct for temperature variations.

The transistors $Q_1$ and $Q_2$, together with resistors $R_3$, $R_4$, $R_5$ and $R_6$ can be eliminated from the timer 13 circuitry by connecting the end of the piezoresistive element $R_1$ remote from the junction with piezoresistive element $R_2$ directly to the source of supply $+V$ and the junction of the piezoresistive elements $R_1$ and $R_2$ to pin 7 of the timer 13 and the end of the piezoresistive $R_2$ remote from the junction with piezoresistive element $R_1$ to the side of the capacitor C remote from ground potential. This connection constitutes a series circuit between the source of supply $+V$ and ground potential comprising the piezoresistive element $R_1$, piezoresistive element $R_2$ and the capacitor C, with the junction of the piezoresistive elements $R_1$ and $R_2$ being connected to pin 7 of the timer 13. The other pin connections of the timer 13 remain the same. The operation of the timer 13 in this embodiment is such that the capacitor C charges through both piezoresistance elements $R_1$ and $R_2$ and discharges only thru the piezoresistive element $R_2$. Accordingly, with no pressure differential at the sensor 11, an output 14 is produced on the lead 15 wherein the high portion $T_1$ is twice as long as the low portion $T_2$ whenever the piezoresistive elements $R_1$ and $R_2$ are equal. This mode of operation of the timer 13 is fully described in the data sheets for the Signetics Corporation model NE/SE 555 integrated circuit timer 13, the contents of which are incorporated herein by reference. As with the embodiment which was described hereinabove in detail in conjunction with FIGS. 1 and 2, the ratio r of the voltage levels defined by the time intervals $T_1$ and $T_2$ is linear with respect to pressure P. Accordingly, this embodiment also enables the pressure P to be calculated in a manner similar to that described hereinabove in conjunction with FIGS. 1 and 2. It is possible, however, that the inequality of the charge and discharge times of the capacitor C in this embodiment may affect the timing measurement accuracy or the necessary resolution requirements.

What is claimed is:

1. A digital pressure transducer comprising;
   a timing circuit having an output including a first level and a second level,
   a first resistive element $R_1$ coupled to said timing circuit with the magnitude of at least said resistive element $R_1$ determining the time duration $T_1$ of said first level,
   a second resistive element $R_2$ coupled to said timing circuit with the magnitude of at least the resistive element $R_2$ determining the time duration $T_2$ of said second level, and
   a pressure transducer including said first and second resistive elements $R_1$ and $R_2$;
   said first and second resistive elements $R_1$ and $R_2$ incorporated in said transducer in such a manner that a change of pressure P increases the resistance of the first resistive element $R_1$ to increase the time duration $T_1$ of said first level and decreases the resistance of the second resistor element $R_2$ to decrease the time duration $T_2$ of said second level;
   the ratio r of the time duration of the first and second levels being indicative of the pressure P at the transducer.

2. The digital pressure transducer according to claim 1 wherein;
   the magnitude of the first resistive element $R_1$ is substantially equal to the magnitude of the second resistive element $R_2$ absent a pressure differential at said pressure transducer.

3. The digital pressure transducer according to claim 1 wherein;
   said first and second resistive elements $R_1$ and $R_2$ are piezoresistive.

4. The digital pressure transducer according to claim 2 wherein;
   the ratio r of the time duration of said first and second levels which is indicative of the pressure P at the transducer is given by the equation $r=(T_1-T_2)/(T_1+T_2)$.

5. The digital pressure transducer according to claim 1 wherein;
   the ratio r of said first and second levels which is indicative of the pressure P at the transducer is given by the equation $r=(R_1-R_2)/(R_1+R_2)$.

6. The digital pressure transducer according to claim 1 wherein;
   the ratio r is a linear function of the pressure P at said transducer.

7. The digital pressure transducer according to claim 1 further including;
   a source of clock pulses,
   a first counter,
   first gating means coupled between said first counter and said source of clock pulses to selectively enable said first counter to accumulate said clock pulses to determine the time duration $T_1$ of the first level of said timing circuit,
   a second counter, and
   second gating means coupled between said second counter and said source of clock pulses to selectively enable said second counter to accumulate said clock pulses to determine the time duration $T_2$ of the second level of said timing circuit.

8. The digital pressure transducer according to claim 7 further including;
   means coupled to said first and second counters for determining said ratio r.

9. The digital pressure transducer according to claim 8 further including;
   means for determining the magnitude of said pressure P from said ratio r.

10. The digital pressure transducer according to claim 1 further including;
    counting means selectively coupled to said timing circuit for determining the time duration $T_1$ of said first level output and the time duration $T_2$ of said second level output.

11. The digital pressure transducer according to claim 10 further including;

means coupled to said counting means for determining the ratio r defined by the equation $$r = (T_1 - T_2)/T_1 + T_2).$$

12. The digital pressure transducer according to claim 11 further including;

additional means for determining the magnitude of the pressure P at said pressure transducer from the determined ratio r.

13. The digital pressure transducer according to claim 1 wherein;

a change in pressure P at said transducer causes the magnitude of resistor element $R_1$ to increase and causes the magnitude of resistor element $R_2$ to decrease by an equal amount.

* * * * *